UNITED STATES PATENT OFFICE.

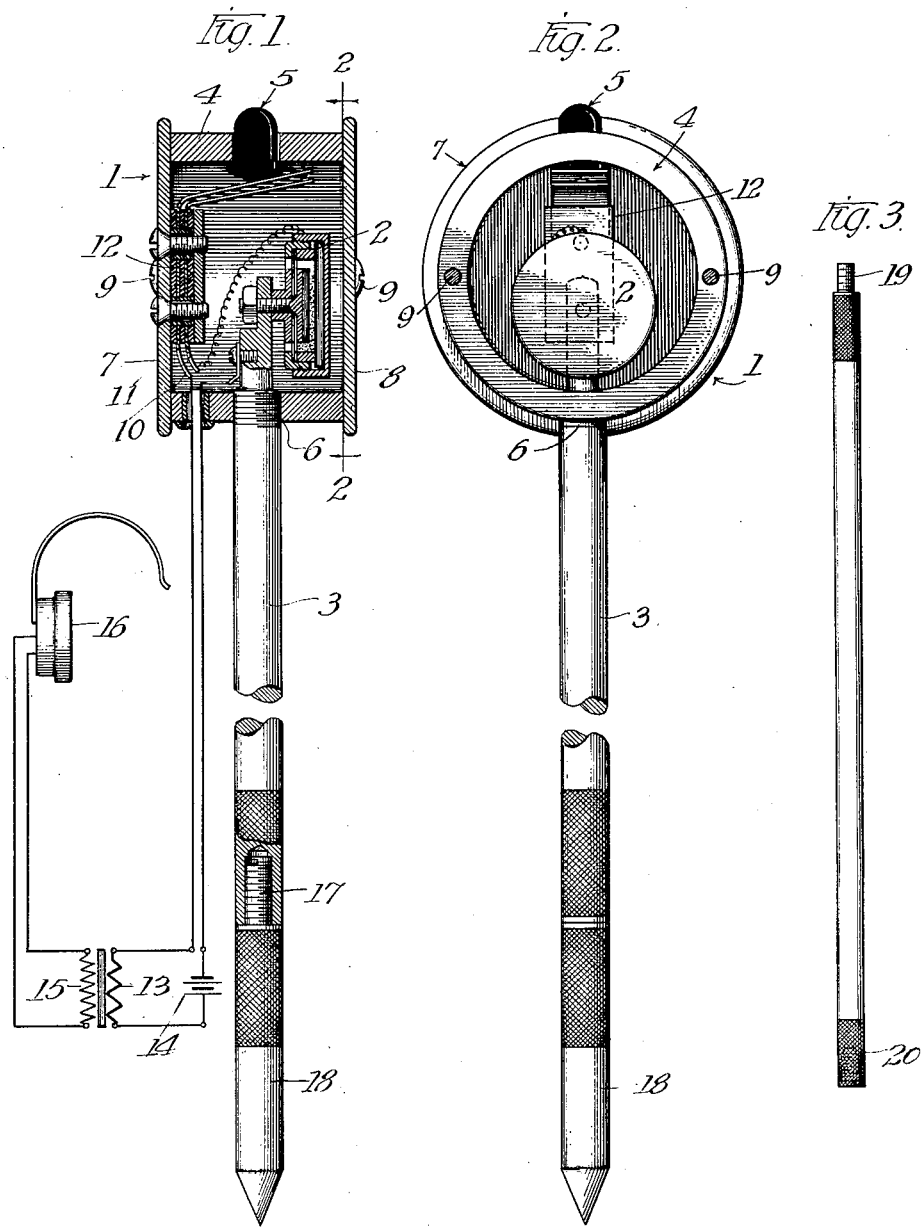

WILLIAM W. DEAN, OF ROCHESTER, NEW YORK, ASSIGNOR TO STROMBERG-CARLSON TELEPHONE MANUFACTURING COMPANY, OF ROCHESTER, NEW YORK, A CORPORATION OF NEW YORK.

SOUND-AMPLIFIER.

1,220,501. Specification of Letters Patent. Patented Mar. 27, 1917.

Application filed August 28, 1915. Serial No. 47,757.

*To all whom it may concern:*

Be it known that I, WILLIAM W. DEAN, a citizen of the United States, residing at Rochester, in the county of Monroe and State of New York, have invented a certain new and useful Improvement in Sound-Amplifiers, (Case 2ᴬ,) of which the following is a full, clear, concise, and exact description, reference being had to the accompanying drawings, forming a part of this specification.

The present invention relates to a sound amplifier.

It is a well-known fact that sound travels more readily through an elastic solid than through a gas. I employ this fact in detecting and amplifying sounds that are difficult to perceive. The detector and amplifier which is the subject of the present invention is employed in detecting knocks in engines, sounds indicative of unusual conditions in machinery of all kinds, leaks in pipes, and, in fact vibrations and noises of all kinds.

In the accompanying drawings which form a part of the present specification, and in which I have illustrated the preferred embodiment of my invention, Figure 1 is a side elevation with the casing shown in section;

Fig. 2 is a front elevation with the casing sectioned on the line 2—2 of Fig. 1; and Fig. 3 is an elevation of an extension-rod for adjusting the length of the sound-transmitting rod.

I am aware that microphonic devices have been employed to detect and amplify sounds, but, as heretofore constructed, these devices have been cumbersome and constructed on faulty design.

The device shown in the drawings comprises a casing 1, which contains the inertia microphone 2, and the transmitting-member 3, which comprises a jointed rod. The casing 1 comprises a cylindrical shell 4, through the top of which a push-button-member 5 projects and into the bottom of which the upper section of the jointed rod 3 is screw-threaded at 6. The cylindrical casing 4 is closed by end-plates 7 and 8, which are secured in any suitable manner, as by means of the screws 9. A pair of normally-open contact-springs 10 and 11 are mounted in a block of insulation 12, which is secured to one of the end-plates 7. The springs 10 and 11 have their free ends extending beneath the push-button 5 in such manner that pressure upon the button 5 closes contact between the springs. The upper section of the jointed rod 3 extends into the casing 4 and has secured thereto within the casing 4 the inertia microphone 2, one terminal of which is connected to the spring 11 and the other of which is grounded on the rod 3. The coöperating contact spring 10 is connected, through the primary winding 13 of an induction coil, to the battery 14, the other side of which is connected to the inner electrode of the microphone 2. The secondary winding 15 of the induction coil is connected to a suitable telephone receiver, which may be of the familiar watchcase type, so as to be easily clamped to the ear of the operator. The transmitting-member 3 is composed of a number of sections which are screw-threaded together, as shown at 17, so as to form, for the purpose of sound-transmission therethrough, one continuous rod. The lowermost section 18 is formed of a hardened steel point, so that the rod may be brought into firm molecular engagement with the object from which sound is to be received.

In Fig. 3 I have shown an extension rod, which is provided with a male coupling end 19 and a female coupling end 20, whereby the sound-transmitting member 3 may be made extensible as desired, so as to gain access to remote points.

The casing which surrounds the microphone is preferably made of insulating material, so that the same may safely be grasped by the operator without fear of electrical shock. The button 5 which closes the operating circuit of the device, is so placed that when the hand of the operator pushes the point 18 against the object to be tested, the circuit will be automatically closed to render the device operative. While the casing 1 is secured to the sound-transmitting member 3 so that this member may readily be manipulated by the hand of the operator, there is no connection otherwise between the casing and the microphone 2, so that pressure upon the casing, or knocking the same, as by accidental dropping, will not change the adjustment of the parts.

It will be apparent from the above description that I have provided an efficient and convenient sound-amplifier which embodies marked mechanical and operating features.

What I claim is:

1. In combination, a rod having at one end a hardened steel point, a granular carbon microphone directly connected to the other end of said rod only, a casing secured to said rod independently of said microphone and surrounding said microphone, and a switch for said microphone, said switch being carried by said casing.

2. In combination, a jointed rod comprising a plurality of sections secured end to end, the outermost section having a hardened steel point, a microphone connected to the opposite end of said rod, a casing secured to said rod and surrounding said microphone, a switch in said casing, said switch being operated by act of the operator in pressing the point of the rod against an object.

3. In combination, a rod having a hardened point, an inertia microphone connected to the opposite end of said rod, a casing surrounding said microphone and secured to said rod, and a switch having a projecting member, said member passing through said casing and having its end adapted to be depressed by the hand of the operator in pressing the point of the rod against an object.

4. In combination, a transmitting-member comprising a rod having screw-threaded sections secured end to end, the outer end of said member comprising a hardened point, an inertia microphone secured to the inner end of said rod, a casing surrounding said microphone and secured to said rod, a normally-open switch in said casing, said switch having an operating member projecting through the top of the casing in position to be depressed by the hand of the operator in pressing the point of the transmitting-member against an object.

5. In combination a rod having at one end a hardened steel point, a granular carbon microphone directly connected to the other end of said rod only, a casing surrounding said microphone but being out of contact therewith, said casing being secured to said rod adjacent the point of attachment of said microphone, said casing being substantially closed and forming a guard against the entry of extraneous noises or vibrations and as a handle for the operator.

In witness whereof, I hereunto subscribe my name this 25 day of Aug. A. D. 1915.

WILLIAM W. DEAN.